Aug. 4, 1942.  H. D. SEELINGER  2,292,296
LOCOMOTIVE HEADLIGHT CONTROL SYSTEM
Filed Dec. 22, 1941
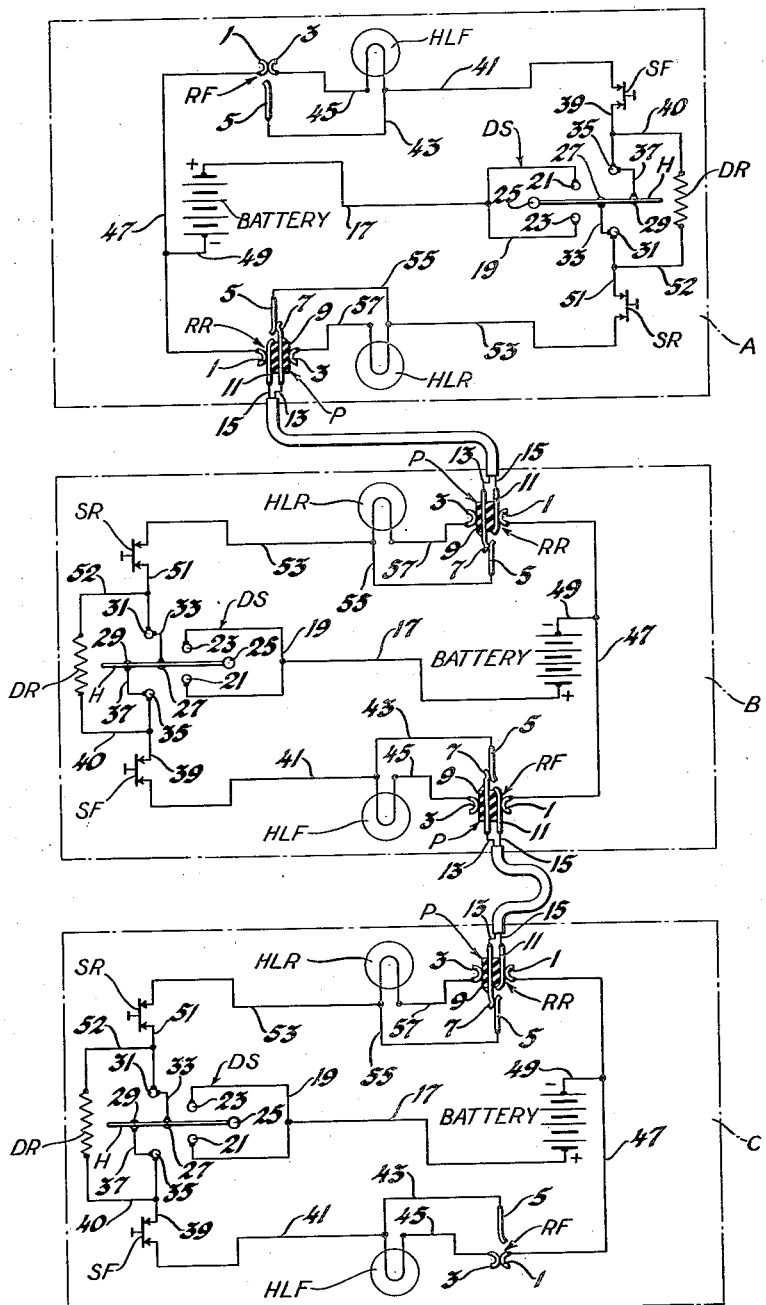
Inventor
Horace D. Seelinger
By Blackmore, Spencer & Flint
Attorney Patented Aug. 4, 1942

2,292,296

UNITED STATES PATENT OFFICE 2,292,296

LOCOMOTIVE HEADLIGHT CONTROL SYSTEM

Horace D. Seelinger, Detroit, Mich., assignor to General Motors Corporation, Detroit, Mich., a corporation of Delaware Application December 22, 1941, Serial No. 424,092

7 Claims. (Cl. 171—97)

The present invention relates generally to headlight control systems and more particularly relates to locomotive headlight control systems which may be operated singly or in multiple.

Locomotives used in switching or transfer service are frequently reversed, and are usually provided with a headlight on each end, and individual control means for controlling the light intensity of each of the headlights to conform to railway operating rules. These rules require that a bright headlight be displayed on the head end of a locomotive for forward movement and a dim light on the rear end for back up movement, and that both headlights be turned off when the locomotive is stopped in a siding.

Where a number of electric or Diesel electric locomotives, each having the above described headlight arrangement and individual headlight control means, are coupled together for multiple unit control and operation, only the headlights at the extreme ends of the coupled units are necessary and the other headlights adjacent the coupled ends of these units may be turned off. With the usual individual control means provided for each headlight on each locomotive unit, each time the coupled units are reversed and each time they are stopped on a siding, it is necessary to operate the control switches on each of the locomotive units coupled at the ends of a plurality of units, which makes it necessary for the locomotive engineer to change positions frequently. On locomotive units not having an end-to-end gangway it is accordingly necessary for the engineer to climb down off one end unit and walk the right of way to the other end units, causing inconvenience and delay in displaying the proper headlight indication at either end of the coupled units.

The object of the present invention is the provision of a simple headlight control system for a locomotive unit having a front and rear headlight and means for conveniently controlling these headlights in combination or individually, and including means by which other locomotives having identical headlight control systems may conveniently be interconnected electrically in either end-to-end relation when the locomotive units are mechanically coupled together in either end-to-end relation to automatically render all the headlights adjacent the coupled ends inoperative and permit only the headlights on the extreme ends of the coupled and connected units to be controlled conveniently either in combination or individually by the control means on any one of the connected locomotive units.

The headlight control system by which the above object is accomplished will be better understood by reference to the following detailed description and the single sheet of drawings showing diagrammatically a plurality of locomotives having identical headlight control systems electrically connected in end-to-end relation.

The individual locomotive units are indicated generally in spaces A, B and C bounded by the dash and dot lines. The locomotives are provided with conventional mechanical couplers, not shown, and conventional control connections, not shown, for controlling and operating the locomotive units in multiple. The headlight system of each locomotive unit and the electrical connections for interconnecting the individual headlight systems, all of which, as shown diagrammatically, are identical, make possible multiple operation of the headlight systems in the manner set forth in the object.

Each headlight system includes a battery indicated on the drawing, a forward headlight HLF, a rear headlight HLR, front and rear electrical receptacles shown respectively at RF and RR, front and rear headlight disconnecting or control switches indicated respectively at SF and SR, and a master dimming switch DS and a dimming resistor DR. The electrical receptacles are provided for connecting the headlight control systems of a plurality of locomotives in either end-to-end relation when the locomotives are mechanically coupled in either end-to-end relation, suitable flexible connections having plugs P attached at either end thereof being shown interconnecting the headlight systems of the locomotive units A, B and C. It will be noted on the drawing that the locomotive unit A is shown connected in opposite end-to-end relation with respect to the end-to-end relation of the locomotive units B and C.

The individual forward and rear headlight disconnecting or control switches SF and SR are normally retained in the closed position and each is located closer to the headlight it controls, as shown. The master dimming switch DS is of the double throw, three position, multiple fixed pole or contact type having a manually operable contact H which is movable from the central position in which it is shown to either a forward or reverse position. As will be subsequently explained, with both headlight disconnecting switches closed, movement of the contact H of the master dimming switch DS to the forward position, toward the forward headlight, connects the forward headlight directly to the battery to provide maximum illumination therefrom and simultaneously connects the rear headlight to the battery through the dimming resistor DR to reduce the illumination thereof. Conversely, when contact H is moved to the rear position toward the rear headlight, this headlight is directly connected to the battery to provide maximum illumination of the rear light and the front headlight is connected to the battery through the dimmer resistor to provide reduced illumination therefrom.

The receptacles RF and RR are identical, each having three contacts. Each receptacle is of the polarized type having a suitably formed external opening, not shown, to permit the plugs P, also of the polarized type having two contacts and of suitable form, to be entered into the receptacle opening in one position only, to establish the following electrical connections between the receptacle and plug contacts whereby the headlights on adjacent ends of the interconnected locomotive units are disconnected and the headlights on the remote ends are interconnected.

Each receptacle, shown diagrammatically, comprises two movable contacts 1 and 3, which are normally biased into firm electrical contact by any well known type of biasing means, not shown, and a flexible contact 5 fixed in spaced relation with respect to the movable contacts 1 and 3.

Each plug P, shown diagrammatically, comprises a flexible contact 7 having one end embedded in an insulating block 9 and an external contact 11 fixed on the block. The outer ends of the contacts and block are shown formed so that the plug may be easily inserted in one position only into the receptacle opening, not shown, and easily entered between the contacts 1 and 3 thereof to move them apart and cause an electrical contact to be established between the flexible contact 5 of the receptacle and the flexible contact 7 of the plug, and also to cause an electrical contact to be established between the external contact 11 of the plug and the movable receptacle contact 1. The other movable receptacle contact 3 is then positioned as shown in mechanical contact only with the insulating block 9 when the plugs are fully entered into the receptacle as shown. As previously mentioned, the form of the plugs P and the openings, not shown, of the receptacles RF and RR are such as to allow the plugs to be entered into the receptacle in one position only, thereby to establish only the above described electrical connections.

As shown on the drawing, pairs of plugs P are interconnected by a pair of flexible jumper conductors 13 and 15. Each conductor 13 is connected between the flexible contacts 7 of these plugs and each conductor 15 is connected between the other or external contacts 11 of these plugs.

The electrical connections between the headlights, disconnecting control switches and master dimming switches and the receptacle contacts described above and located on each of the locomotive units are identical and will now be described in detail.

The positive pole of the locomotive battery is connected by conductors 17 and 19 to both the forward and rear contacts shown respectively at 21 and 23 of the master dimming switch DS. The movable contact H of this switch is pivoted at 25 and is shown in the central position bridging a pair of central contacts 27 and 29 of the switch. The central switch contact 27 is connected to another rear contact 31 of the switch by a conductor 33, and the other central contact 29 is connected to another forward switch contact 35 by a conductor 37.

The forward dimming switch contact 35 is connected to one contact of the forward headlight disconnecting control switch SF by a conductor 39, and the other contact of this switch is connected to one terminal of the forward headlight HLF by a conductor 41. The flexible contact 5 of the forward receptacle RF is also connected by a conductor 43 to the conductor 41. The other forward headlight terminal is connected to the contact 3 of the forward receptacle RF, and the other contact 1 thereof is connected by conductors 47 and 49 to the negative battery terminal.

The connections from the rear contact 31 of the dimming switch DS are similar to those described above, a conductor 51 serving to connect the rear dimming switch contact 31 to one contact of the rear headlight disconnecting control switch SR. The opposite terminals of dimming resistor DR are connected respectively by conductors 40 and 52 to conductors 39 and 51 connecting respectively the forward and rear contacts 35 and 33 of the dimming switch DS with the forward and rear headlight disconnecting control switches SF and SR. The other contact of the rear headlight disconnecting control switch SR is connected by a conductor 53 to one terminal of the rear headlight HLR, and a conductor 55 is connected between the conductor 53 and the flexible contact 5 of the rear receptacle RR. The other rear headlight terminal is connected by a conductor 57 to the contact 3 of the rear receptacle, the contact 1 of which is also connected by the previously mentioned conductors 47 and 49 with the negative battery terminal.

*Multiple unit operation*

On each of the locomotive units A, B, and C the headlight disconnecting control switches SF and SR are shown in the normal closed position and the master dimming switches DS are shown in the central position. The plugs P are shown inserted in the receptacles RR and RF to connect the adjacent ends of the locomotive units A, B and C. With the units so connected the headlights in the extreme ends of the coupled units, which are the respective headlights HLF on locomotives A and B, may be controlled individually or in combination by the control and master dimming switches on any locomotive unit in the following manner:

Assume that forward operating direction of the units is desired, and that the operator is located on locomotive A. The operator moves the movable contact H of the master dimming switch in the direction of movement desired, that is, forward, from the central position, which will be assumed to be toward the headlight HLF on locomotive unit A. The contact H will then bridge contacts 21 and 37 and the positive battery terminal will be connected to one terminal of headlight HLF through conductors 17, 19, 39 and 41, and the return circuit to the negative battery terminal is completed through the movable contacts 1 and 3 of the receptacle RF of locomotive unit A, which are shown normally in contact, and conductors 47 and 49 to the negative battery terminal. The headlight HLF will, accordingly, be illuminated at maximum intensity. Movement of the contact H to the forward position likewise establishes a connection from the battery of the unit A through the dimming resistor DR and the following conductors to one terminal of the headlight HLF of the unit C. The conductors on the unit A making up a part of this connection are conductors 17, 19, 39 and 40, dimming resistor DR, conductors 52, 51 and 55, and the flexible contact 5 of receptacle RR connected to the conductor 55. As the plug P is in the receptacle RR of the unit A, the movable contact 3 thereof contacts only the insulating block 9 of the plug P, and as one terminal of the headlight HLR of the unit A is connected to the contact 3 no current can flow through this light from conductor 53, and this headlight is, accordingly, rendered inoperative. The flexible contact 5 of the receptacle RR of the unit A is shown in contact with a flexible plug contact 7, and this plug contact is connected by the flexible conductor 13 to the flexible contact 5 of the plug P shown in contact with the flexible contact 7 of receptacle RR on the locomotive unit B to establish a connection between the A and B locomotive units.

The conductors on the unit B comprising another part of the above described connection include the conductor 55 connected to the flexible contact 5 of the receptacle RR and conductors 53, 51, 33, 37, 39, 41 and 43, the latter being shown connected to the contact 5 of the receptacle RF. It will be noted also that separate plugs P shown in each of the receptacles RR and RF located at both ends of the locomotive unit B and the movable contacts 3 of these receptacles are shown in contact only with the insulating blocks of these plugs so that both of the headlights HLR and HLF are, accordingly, also rendered inoperative, as one terminal of each is connected to these contacts 3 to prevent current from passing through these lights. The connection between locomotive units B and C is established by contact of the flexible plug contacts 7 shown in contact with the flexible receptacle contacts 5 of the receptacles RF and RR on the units B and C, respectively, and the flexible conductor 13 interconnecting these flexible plug contacts 7.

The conductors on the unit C by which the above described connection is completed from the positive battery terminal of the unit A to one terminal of headlight HLF on the unit C are as follows: conductor 55 connected to the flexible contact 5 of receptacle RR of the C unit and conductors 55, 53, 51, 33, 37, 39 and 41 to one terminal of the headlight HLF.

The return circuit from the other terminal of headlight HLF on the C unit to the negative terminal of the battery of the A unit is completed through the movable contacts 1 and 3, shown in contact, of the receptacle RF on the unit C, conductors 47 of the C, B and A units which are connected between the movable contacts 1 of the receptacles shown in contact with the plug contacts 11 interconnected by the flexible conductors 15 and conductor 49 on the unit A, which is connected between the conductor 47 and negative battery terminal of the unit A. Completion of the above described circuit causes the headlight HLF on the unit C to be connected in series with the dimming resister DR and battery of the unit A, to cause this headlight to be illuminated dimly. The headlight HLR on the locomotive unit C adjacent the unit B is also rendered inoperative for the same reasons as described previously, as one terminal of this headlight is connected to the movable contact 3 of receptacle RR, which is shown in contact with the insulating block 9 of the plug P inserted therein.

It will be obvious if the direction of movement of the connected locomotives A, B and C be reversed that it will only be necessary to move the contact H of the master dimming switch DS on the unit A in the opposite direction to bridge the contacts 31 and 33 to connect the headlight HLF on the unit A in series with the dimming resistor DR and battery on this unit to dim this headlight, and the headlight HLF will then be connected directly with the battery of the unit A to cause an increase in the illumination of this headlight. The circuit connections through each of the locomotive units A, B and C are the same as described above except for the connection through the dimming resistor DR.

The above described headlight control system when connected as shown and described causes the headlights adjacent the connected ends of any number of locomotive units to be rendered inoperative and permits joint control of the headlights on the extreme ends of the connected locomotives in the manner described. It will be apparent from the above description that the circuit connections described above only permit control of the two headlights located at the extreme ends of the connected units by movement of the contact H of any master dimming switch DS on any locomotive unit from the central position to either the forward or reverse positions to cause a bright headlight to be displayed at the extreme end of the connected units toward which the contact H is moved and a dim headlight at the opposite extreme end of the connected units, the current for the lights being supplied from the battery on the control unit, that is, the unit on which movement of the contact H takes place. It will be evident that where a plurality of headlight systems are connected in either end-to-end relation as shown, either or both of the headlights on the extreme ends of the units may be rendered inoperative at will by opening either or both of the headlight disconnecting control switches SF or RF on any one of the control units. Opening of the disconnecting switch on any unit closest to the headlight on one end of the connected units renders this headlight inoperative.

Removal of the plugs P from the receptacles RF and RR on a locomotive unit allows the movable contacts 1 and 3 of the receptacles to be biased into contact to render both headlights HLF and HLR effective when both disconnecting control switches SF and SR are normally closed and the contact H of the master dimmer switch DS is moved from the central position toward either of the end headlights. A bright light is displayed by the headlight at one end toward which the contact is moved and a dim light is displayed at the opposite end. Either of the headlights at the opposite ends may be turned off by opening the control switch closest to a particular end headlight and both headlights may be turned off by opening both control switches.

The above described headlight control system, when operated singly or in multiple, provides the advantages and conforms to railway operating procedure for headlights as clearly set forth above.

I claim:

1. In a multi-unit vehicle, each unit having a headlight and a receptacle connector on each end thereof, a power source connected to the headlights and receptacle connectors, each receptacle connector including disconnecting means for the headlight adjacent thereto, and interconnected plug connectors insertable into receptacle connectors on adjacent ends of said units for operating the headlight disconnecting means thereof and for establishing a connection to the headlights on the opposite remote ends of the interconnected units.

2. In a multi-unit vehicle, each unit having a headlight and receptacle connector connected therewith located on each end of each unit, each receptacle including disconnecting means for the headlight adjacent thereto, interconnected plug connectors insertable into the receptacle connectors on adjacent ends of the units for operating the headlight disconnecting means included therein and for establishing a connection between the headlights on the opposite remote ends of the multi-unit vehicle, a power source on one of said units, and means for connecting the power source to the connections established between the headlights on the remote ends of the interconnected vehicle units.

3. In a multi-unit vehicle, each unit having a headlight and a receptacle connector on each end thereof, power connections between the headlights and receptacle connectors, each receptacle connector including headlight isolating means connected to the headlight adjacent thereto, at least one of said units having a power source and a power switch connected between the power source and power connections, and means for interconnecting the power connections of each unit, said means comprising pairs of plug connectors interconnected by power conductors, said plugs being insertable into the receptacle connectors, insertion of said plug connectors in the receptacle connectors on adjacent ends of the units causing operation of the receptacle headlight isolation means for the headlights adjacent thereto and also causing the power conductors on each unit to be interconnected to allow the headlights on the remote ends of the interconnected vehicles to then be connected with the power source by the power switch.

4. In a multi-unit vehicle, each unit having a headlight and a receptacle connector on each end thereof, a power source connected to the headlights and receptacle connectors, each connector including disconnecting means for the headlight adjacent thereto, manually operable switching means for the headlights comprising a master switch for connecting both headlights to the power source, individual headlight disconnecting switches, and means for interconnecting the receptacles on adjacent ends of the units comprising electrically interconnected plugs insertable in these receptacles for causing operation of the respective disconnecting means included therein for the headlights adjacent thereto and for causing the individual switching means on each unit to be connected to the headlights on opposite ends of the interconnected units for connection thereby to the power source of any unit.

5. In a multi-unit vehicle, each unit having a headlight and a receptacle connector on each end thereof, a dimming resistor connected in a series loop circuit with the headlights and connectors, each receptacle connector having disconnecting means for the headlight adjacent thereto, a battery and a battery switch connected with the series circuit, said switch in its open position serving to shunt said resistor and movable to closed positions at either side of its open position to connect one headlight directly to the battery and to connect the resistor in series between the battery and the other headlight, and interconnected connector plugs insertable in receptacles on adjacent ends of the units to cause operation of the headlight disconnecting means therein, thereby rendering the headlights on adjacent ends of the units inoperative and establishing a connection between each unit battery switch and the headlights on the remote ends of the vehicle for control by operation of any switch to either closed position whereby either of these two headlights may be illuminated brightly or dimly at will.

6. In a multi-unit vehicle, each unit having a headlight and a polarized receptacle on each end thereof, a dimming resistor, power conductors interconnecting the headlights, the receptacles and resistor, means for isolating each headlight included in the receptacle adjacent that headlight and connected thereto, means connected across the power conductors for energizing the same, said means comprising a source of energy, a master switch movable from an open position toward either end headlight to closed position, said master switch being connected to the resistor and normally serving to shunt said resistor when in the open position and causing the resistor to be connected in series between the source of energy and one of the other end headlights when moved away from either of these headlights to either closed position, the headlight toward which the switch is moved being then connected directly to the source of energy, and power connections having polarized plug connectors connected thereto, and the plugs being insertable in one position only in the receptacle connectors on adjacent ends of said units to isolate the headlights on adjacent ends of the units and to connect the headlights on remote ends of the interconnected units with the master switch of each unit for control by any one of these switches in the same manner as described above as to the direction of movement of any switch irrespective of the end-to-end connection of the units through the means interconnecting the adjacent end receptacles.

7. In a multi-unit vehicle, each unit having a headlight and a polarized receptacle connector on each end thereof, each receptacle connector including operable headlight disconnecting means connected to the headlight adjacent thereto, power connections including individual manually operable headlight disconnecting switches for each headlight located adjacent thereto, a source of power connected between the power connections, and means for interconnecting the receptacles on adjacent ends of said units, said means comprising power conductors having polarized plug connectors on either end thereof which are insertable in adjacent end receptacle plugs for operating the headlight disconnecting means included therein and for interconnecting the headlights on the remote ends of the interconnected units with the disconnecting switches of each unit so that manual operation of any disconnecting switch on any unit closest to either of these end headlights disconnects either headlight.

HORACE D. SEELINGER.